March 29, 1932.    J. TAYLOR    1,851,785
COIL WINDING AND CUTTING MACHINE
Filed April 18, 1931    3 Sheets-Sheet 1
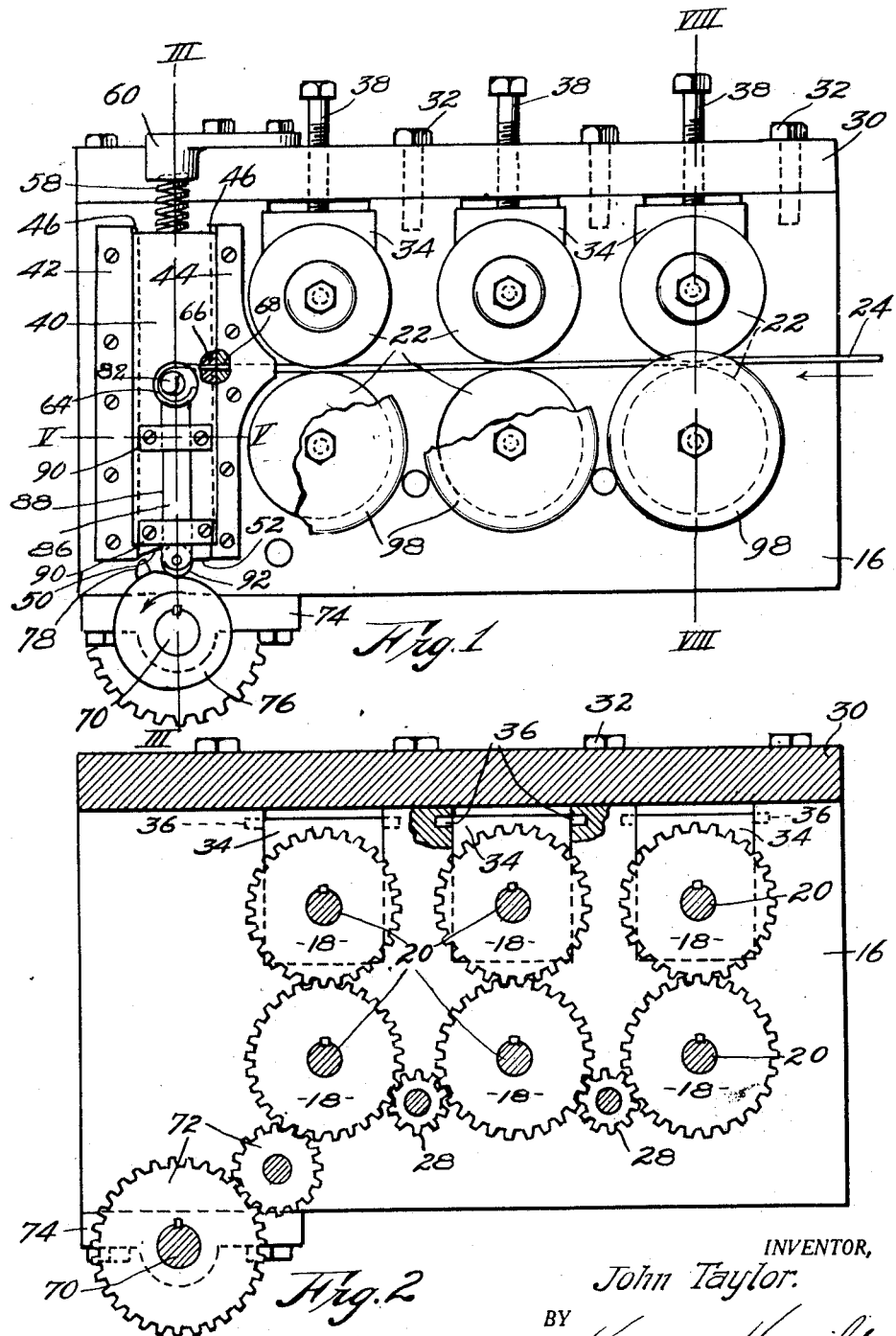
INVENTOR,
John Taylor.
BY
Hovey & Hamilton,
ATTORNEYS.

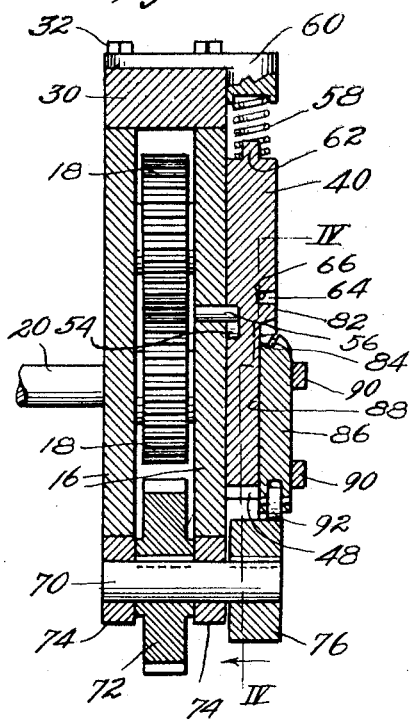
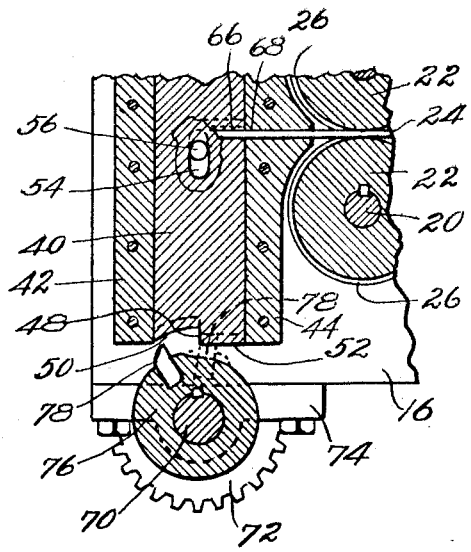
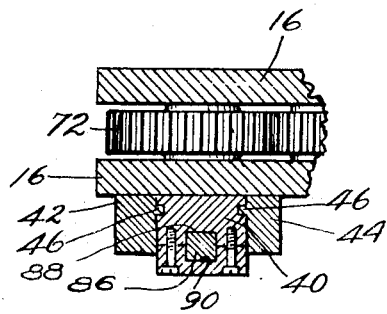
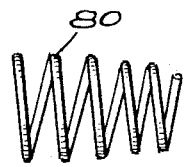
INVENTOR,
John Taylor.

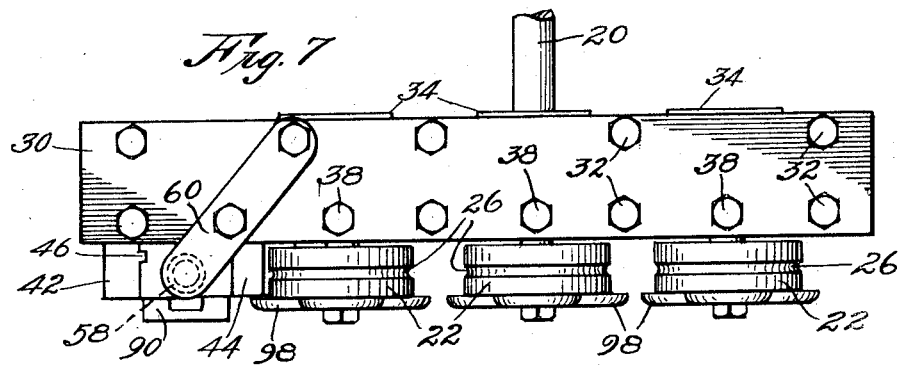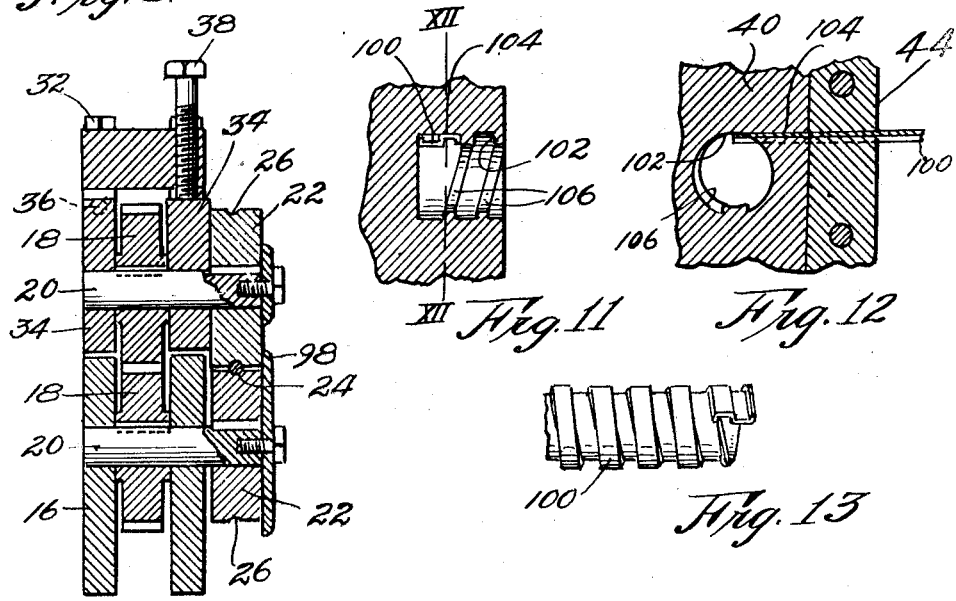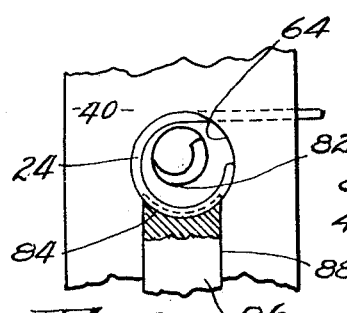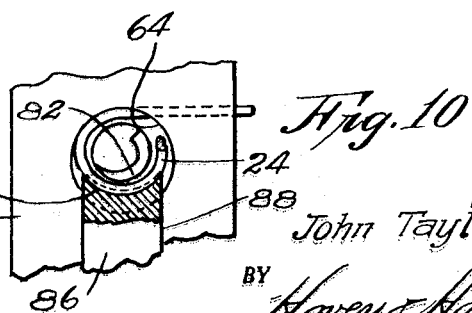

Patented Mar. 29, 1932

1,851,785

UNITED STATES PATENT OFFICE

JOHN TAYLOR, OF KANSAS CITY, MISSOURI

COIL WINDING AND CUTTING MACHINE

Application filed April 18, 1931. Serial No. 531,237.

This invention relates to material handling apparatus and particularly to machines constructed to form and cut off material in the manufacture of articles from stock fed into such a machine in the form of a continuous strip.

One of the salient objects of the invention is the provision of a material handling machine adapted to continuously form separate articles from a stock strip without interrupting the operation of the machine or stopping the feeding action at the time the formed article is severed from the continuous strip entering the apparatus.

Another and more specific object of the invention is the contemplation of a winding and cutoff machine having a reciprocating forming block which is moved to sever the material as it is continuously fed into the machine.

A yet further object of the invention is the provision of means within a winding machine which is designed to alter the diameter of the article being formed as formation takes place, said means including also a device for actuating the machine parts to a material-severing position after a predetermined amount of material has been formed or wound.

Specific structural details embodied in a machine built in accordance with this invention, as well as the method of operation, will appear during the course of the detailed specification, referring to the accompanying drawings, wherein:

Figure 1 is a side elevation of a winding and cutoff machine embodying the features of this invention;

Fig. 2 is a vertical section through the machine taken along a plane in front of the gear train;

Fig. 3 is a vertical cross-section through the machine taken along line III—III of Fig. 1;

Fig. 4 is a fragmentary sectional view taken along line IV—IV of Fig. 3, looking in the direction of the arrow;

Fig. 5 is a fragmentary cross-section taken on line V—V of Fig. 1;

Fig. 6 is a side elevation of a spring formed by the machine contemplated;

Fig. 7 is a top plan view of the machine illustrated in Fig. 1;

Fig. 8 is a vertical cross-section through the machine taken on line VIII—VIII of Fig. 1;

Fig. 9 is an enlarged fragmentary detailed view of the winding cavity formed in the reciprocating block;

Fig. 10 is a similar view but showing the follower in position to diminish the diameter of the article being wound;

Fig. 11 is a fragmentary sectional view through the winding cavity of a forming block showing a modified form of the invention;

Fig. 12 is a fragmentary sectional view along line XII—XII of Fig. 11; and

Fig. 13 is a fragmentary side elevation of a portion of a loom or spiral cable armor which has been formed by the machine contemplated by this modified form of the invention.

Like reference characters will be used to designate similar parts throughout the several views and the operation of the machine made clear during the description of the same. It must be understood that articles of various characters might be made through the use of this machine and its basic principles used in forming material into units of various sizes and shapes. In the instance shown in Figs. 1 to 10 inclusive, a combination of parts has been set up to manufacture springs such as shown in Fig. 6. A supporting frame 16 may be formed of a pair of side plates as illustrated between which is disposed a train of gears comprising gears 18, each keyed to a transverse shaft 20 for the purpose of driving a series of rollers 22, between which passes a continuous stock strip 24.

Rollers 22 may have their peripheries suitably formed to act upon stock 24 in a manner which will form the same to present any desired shape. In the instance illustrated, rollers 22 are each provided with a groove 26, which engages stock strip 24 to move the same along into the hereinafter described forming mechanism. One of said shafts 20 projects beyond frame 16 to a point where the same may be engaged by any suitable source of power; and if desired, a clutch may be used to apply and release such power in the well-known manner. Pinions 28 complete the gear train in so far as the driving of rollers 22 is concerned. A cap plate 30 joins the plates of frame 16 at their upper edge and is secured in position by a number of screws 32, as shown. The uppermost rollers 22 should have their shafts 20 journaled in bearing blocks 34. One block 34 of each set may be pivotally connected as at 36 to frame 16, while the other block 34 of the set is slidably supported by frame 16 in a manner which permits adjusting screws 38 to exert more or less pressure downwardly upon its respective block 34. This construction permits creating pressure of varying degrees upon stock 24 as it passes between rollers 22. As before stated, the annular faces of rollers 22 may be formed to progressively shape material 24 to a desired contour as it approaches the point of cutoff.

Novel means of winding or otherwise acting upon stock 24, as well as means for severing the stock at a predetermined point, is provided in the form of a reciprocating block 40, slidably carried by frame 16 between guide members 42 and 44 respectively. These guide members 42 and 44 are each provided with a longitudinal tongue 46, which enters a groove formed along the sides of block 40 to permit reciprocating movement. Lowermost end of block 40 is constructed to present a step 48, on one side of which is cutaway portion 50, while on the other side is presented a contact face 52.

An elongated depression 54 formed inwardly from one side of block 40 receives pin 56, which serves to limit the movement of block 40 in one direction against the action of a compression spring 58. Bracket 60, carried by plate 30, secures spring 58 in operative position against the upper end of block 40, which may have a projection 62 integral therewith if desired. A winding cavity 64 formed inwardly from one side of block 40 receives stock 24 from a way 66 which communicates tangently with cavity 64, as illustrated in Fig. 9. When stock 24 is being fed into cavity 64, way 66 and way 68, formed in guide member 44, are in registering relation. Stock 24 is acted upon within cavity 64 and is projected therefrom as the article is formed. At a predetermined time it is desirable to sever stock 24 and novel means is employed to so act upon the stock without interrupting the movement of the machine. To perform this function, as well as a further function hereinafter set down, means is provided for moving block 40 upwardly against the resistance of spring 58 to sever stock 24 at the point where way 66 and way 68 join. This means may include a transverse shaft 70, rotated by the drive shaft through the intermediacy of a plurality of gears 72 which may be in mesh with any of the gears 18 or 28 forming a part of the gear train built into the machine. The direction of travel of shaft 70 is indicated by the arrow in Fig. 1 and suitable bearings 74 may be utilized in properly positioning the parts. A cam 76, keyed to shaft 70, carries a radially extending projection 78 which periodically strikes contact face 52, thereby lifting block 40 upwardly to the position shown in dotted lines of Fig. 4. This action immediately severs stock 24 where it enters block 40 and since the dwell of projection 78 upon face 52 is extremely short, severing is performed quickly and block 40 returned to position by spring 58 before the lag in the gear train is taken up.

This quick severing action allows the machine to run continuously and feed stock 24 without appreciable interruption. Step 48 and cutaway portion 50 assist in this action and insure quick release from the action of projection 78. When a spring 80, such as that illustrated in Fig. 6, is made by the machine, cavity 64 is provided with the necessary inclined faces 82 to insure a winding action. Through such winding action the outer end of spring 80 is moved from cavity 64 as formation takes place. Each new coil forces the one just previously made around and over inclined faces 82 and 84 to thrust off the same and expel the formed spring from cavity 64.

The diameter at one end of spring 80 is greater than the diameter at the other end thereof. The greatest diameter is equal to the diameter of winding cavity 64. When stock 24 enters cavity 64, it is forced around the annular periphery thereof to a groove 84, formed in the upper end of a follower 86, carried by block 40 in a groove 88 formed therein and retained in place by a plurality of straps or similar means 90 to allow individual movement with respect to block 40. The lower end of follower 86 is bifurcated as illustrated in Fig. 3 and carries a wheel 92, which rides upon the face of cam 76 as it is rotated. When the end of stock 24 enters groove 84 in the end of follower 86, wheel 92 is riding over that portion of cam 76 which allows the arcuate upper end of follower 86 to remain concentric with cavity 64. As the higher surface of cam 76 lifts follower 86, the diameter of the coil formed at cavity 64 becomes progressively less as the highest point on cam 76 is approached. During this action rollers 22 are forcing stock 24 into cavity 64, from whence it is being projected in the form of a spiral having coils of varying diameters commensurate with the movement of follower 86.

One spring 80 is formed as cam 76 completes one full revolution about its center. Fig. 1 illustrates the parts in position just after stock 24 has been severed and just as a new spring is being started. The relation between projection 78 and face of cam 76 is such that severing is performed at the time follower 86 has been lifted to the highest point. Immediately after this severance, the lowest point presents itself to wheel 92 in order to allow the formation of that part of spring 80 having a diameter equal to the diameter of cavity 64.

From the foregoing it will be evident that springs are formed and cut free from stock 24 in a continuous uninterrupted manner. The length of the spring and diameter of the same depends entirely upon the gear train and shape of cam 76. A wide range of possibilities is available through the use of a machine embodying the concepts of this invention, and it is evident that formation of such articles as the loom 100 shown in Fig. 13 might be accomplished through the use of a slightly modified form of cavity 64. This loom is a commonly used covering or armor for battery cables or the like. In this instance cavity 102 merely receives the material through formed slot 104 and the spiral faces 106 wind loom 100 and project it from cavity 102 as long as the rollers of the machine feed stock into the cavity. In this instance there is no variation in the diameter of the article being formed and follower 86, with cam 76, is eliminated from the operation. It is but necessary to use a plain concentric member which carries projection 78 to the cutoff point at predetermined intervals. Since loom 100 is usually formed in lengths, it may be desirable to interpose gears of different ratios in the gear train to cause a longer period to elapse between the times of cutoff. This principle might also be utilized in acting upon material fed into cavity 64 for purposes other than winding, such as measuring to predetermined length. What is performed at this particular point does not vary the value of the invention so long as the operation of treatment and cutoff is performed in the manner having a relation hereinbefore described. In some cases it may be desirable to provide guide plates 98 to overlap the faces of rollers 22 to maintain the same in proper alignment, this especially when heavier forming is to be accomplished.

Having thus described the invention, what is claimed as new and desired to be secured by Letters Patent is:

1. A material handling machine comprising a frame; a series of rollers carried by the frame to engage the material; and a forming block for treating said material after it leaves the rollers, said forming block being movable bodily whereby to sever said material.

2. A material handling machine comprising a frame; a series of rollers carried by the frame to engage the material; a forming block for treating said material after it leaves the rollers; a follower carried by said block; and common means for moving both block and follower.

3. A material handling machine comprising a frame; a series of rollers carried by the frame to engage the material; a forming block for treating said material after it leaves the rollers; means to alter the action of the forming block upon the material, including an independently movable follower carried by the forming block; and actuating means for said follower.

4. A material handling machine comprising a frame; a series of rollers carried by the frame to engage the material; a forming block for treating said material after it leaves the rollers; means to alter the action of the forming block upon the material; including an independently movable follower carried by the forming block; actuating means for said follower; and a device carried by said actuating means to move said forming block to sever the material.

5. A material handling machine comprising a frame; a series of rollers carried by the frame to engage the material; a forming block for treating said material after it leaves the rollers; and means for moving the block to sever said material after the same has been acted upon by said forming block a predetermined length of time.

6. A material handling machine comprising a frame; a series of rollers carried by the frame to engage the material; a forming block for treating said material after it leaves the rollers; a follower carried by said block; and means for moving the follower to alter the action of said block including a cam roller.

7. In a winding and cutoff machine, a series of rollers; a forming block having a material winding cavity; a way to guide material from the rollers to said cavity; and means for moving the forming block to sever the material within said way.

8. In a winding and cutoff machine, a series of rollers; a forming block having a material winding cavity; a way to guide material from the rollers to said cavity; a follower mounted upon said block for independent movement; and means formed within said cavity and follower for ejecting the material after the same is formed.

9. In a winding and cutoff machine, a series of rollers; a forming block having a material winding cavity; a way to guide material from the rollers to said cavity; a follower mounted upon said block for independent movement; and means formed within said cavity and follower for ejecting the material after the same is formed, said forming block being movable to sever the material as it is being ejected.

10. In a winding and cutoff machine, a series of rollers; a forming block having a material winding cavity; a way to guide material from the rollers to said cavity; a follower mounted upon said block for independent movement; means formed within said cavity and follower for ejecting the material after the same is formed, said forming block being movable to sever the material as it is being ejected; a member to move the block to the severing position, and means for returning said block to material-receiving position after the severing operation.

11. In a winding and cutoff machine, a series of rollers; a forming block having a material winding cavity; a way to guide material from the rollers to said cavity; a follower mounted upon said block for independent movement; means formed within said cavity and follower for ejecting the material after the same is formed, said forming block being movable to sever the material as it is being ejected; a member to move the block to the severing position, and means for returning said block to material-receiving position after the severing operation without interrupting the movement of material into the machine.

12. In a winding and cutoff machine, a series of rollers; a forming block having a material winding cavity; guide members to slidably support said block; a way for said material extending through one of said guide members and said block to said cavity; and means for relatively moving said block and guide member to sever material within said way.

13. In a winding and cutoff machine, a series of rollers, a forming block having a material winding cavity; guide members to slidably support said block; a way for said material extending through one of said guide members and said block to said cavity; means for relatively moving said block and guide member to sever the material; and a train of gears interconnecting all rollers and said block-moving means to actuate the same from a common source of power.

14. In a material winding machine, a series of feed rollers; a block having a winding cavity formed therein; and a way, including a part formed by said block, extending from said cavity toward said rollers, the block being movably mounted to offset the part of the way formed thereby, whereby to shear the material being fed through said way by the rollers.

15. In a material winding machine, a series of feed rollers; a block having a winding cavity formed therein; a way in said block extending from said cavity to one side of the block; and means to guide the material from said cavity as it is wound therein including a reciprocating member movable into and out of said cavity to also vary the diameter of the wound member.

16. In a material winding machine, a series of feed rollers; a block having a winding cavity formed therein; a way in said block extending from said cavity to one side of the block; and means to vary the diameter of the wound member as it is being formed within said cavity.

17. In a material winding machine, a series of rollers; a block reciprocably mounted adjacent said rollers; a winding cavity formed within the block; and means to reciprocate said block to sever the material when a predetermined amount has been forced into said cavity by the rollers.

18. In a machine of the character described, a series of rollers; a reciprocably mounted block; a winding cavity formed within the block; a follower slidably carried by said block to vary the size of said cavity; a cam to actuate the follower; a projection on said cam to move the block in one direction to sever the material; means permitting the passage of a predetermined amount of material through said block prior to said severing operation; and means to return said block to the point of beginning.

19. A material handling machine comprising a frame; a series of rollers carried by the frame to engage the material; a forming block for treating said material after it leaves the rollers; and means for moving the block to sever said material after a predetermined length of material has passed into the machine.

In testimony whereof, I hereunto affix my signature.

JOHN TAYLOR.